United States Patent
Witte et al.

(10) Patent No.: US 11,814,038 B2
(45) Date of Patent: Nov. 14, 2023

(54) SYSTEM FOR SECURING THE PARKING OF A MOTOR VEHICLE

(71) Applicant: FOUNDATION BRAKES FRANCE, Drancy (FR)

(72) Inventors: Lennart Witte, Strasbourg (FR); Aleksander Hurwic, Paris (FR)

(73) Assignee: FOUNDATION BRAKES FRANCE, Drancy (FR)

( * ) Notice: Subject to any disclaimer, the term of this patent is extended or adjusted under 35 U.S.C. 154(b) by 347 days.

(21) Appl. No.: 16/761,429

(22) PCT Filed: Nov. 8, 2018

(86) PCT No.: PCT/FR2018/052770
§ 371 (c)(1),
(2) Date: May 4, 2020

(87) PCT Pub. No.: WO2019/092373
PCT Pub. Date: May 16, 2019

(65) Prior Publication Data
US 2021/0001836 A1    Jan. 7, 2021

(30) Foreign Application Priority Data
Nov. 9, 2017  (FR) .................................... 1760529

(51) Int. Cl.
*B60W 30/06*  (2006.01)
*B60W 10/20*  (2006.01)
(Continued)

(52) U.S. Cl.
CPC ............ *B60W 30/06* (2013.01); *B60W 10/20* (2013.01); *B60W 30/18118* (2013.01);
(Continued)

(58) Field of Classification Search
CPC ........... B60W 10/20; B60W 2510/186; B60W 2540/18; B60W 2552/15; B60W 2552/50;
(Continued)

(56) References Cited

U.S. PATENT DOCUMENTS 6,237,504 B1 *  5/2001  Tanahashi .............. B62D 1/265
                                                          104/243
9,114,834 B2 *  8/2015  Hauber ................ B62D 15/027
(Continued)

FOREIGN PATENT DOCUMENTS

DE    102012103059 A1    10/2013
DE    102014202325 A1    8/2015
(Continued)

OTHER PUBLICATIONS

International Search Report for PCT/FR2018/052770 dated Aug. 1, 2019.
(Continued)

*Primary Examiner* — Babar Sarwar
(74) *Attorney, Agent, or Firm* — Pearne & Gordon LLP (57) ABSTRACT

A system for securing the parking of an automobile vehicle parked on a parking area (Z), the vehicle including two steering wheels, and a actuator to modify the orientation of the steering wheels without the action of the driver, the system including a control unit (UC), a system for detecting a parked state of the automobile vehicle, a sensor for detecting the slope of the parking area, sensor for determining the orientation of the steering wheels with respect to the axis of the vehicle, the control unit (UC) being configured to determine the orientation of the steering wheels to put the vehicle in a decreased danger configuration in case of an unwanted movement of the vehicle, and to sending an
(Continued)

instruction to the actuator to orientate the steering wheels according to the orientation determined by the control unit (UC).

15 Claims, 4 Drawing Sheets

(51) Int. Cl.
    *B60W 30/18*           (2012.01)
    *B62D 15/02*           (2006.01)
    *G06V 20/58*           (2022.01)

(52) U.S. Cl.
    CPC ....... *B62D 15/028* (2013.01); *B62D 15/0285* (2013.01); *G06V 20/58* (2022.01); *G06V 20/586* (2022.01); *B60W 2510/186* (2013.01); *B60W 2540/18* (2013.01); *B60W 2552/15* (2020.02); *B60W 2552/50* (2020.02); *B60W 2710/207* (2013.01)

(58) Field of Classification Search
    CPC ....... B60W 2554/00; B60W 2710/207; B60W 30/06; B60W 30/18118; B62D 15/027; B62D 15/028; B62D 15/0285; G06V 20/58; G06V 20/586
    See application file for complete search history.

(56) References Cited

U.S. PATENT DOCUMENTS

| | | | | |
|---|---|---|---|---|
| 10,268,194 | B2* | 4/2019 | Noessner | G05D 1/0055 |
| 10,525,881 | B1* | 1/2020 | Deshpande | B60Q 9/001 |
| 2008/0071457 | A1* | 3/2008 | Shiraki | H02P 3/04 |
| | | | | 188/162 |
| 2009/0128364 | A1* | 5/2009 | Lee | G06V 20/586 |
| | | | | 340/932.2 |
| 2009/0271114 | A1* | 10/2009 | Herbert | G08G 1/168 |
| | | | | 701/301 |
| 2010/0294602 | A1* | 11/2010 | Gustafsson | B60T 13/746 |
| | | | | 188/158 |
| 2011/0057813 | A1* | 3/2011 | Toledo | B60W 10/20 |
| | | | | 340/425.5 |
| 2011/0074604 | A1* | 3/2011 | Hsu | B62D 15/0285 |
| | | | | 340/932.2 |
| 2011/0199236 | A1* | 8/2011 | Hauber | B62D 15/027 |
| | | | | 340/932.2 |
| 2011/0276225 | A1* | 11/2011 | Nefcy | B62D 15/027 |
| | | | | 701/41 |
| 2011/0282549 | A1* | 11/2011 | Choi | B60W 30/12 |
| | | | | 701/41 |
| 2017/0113694 | A1* | 4/2017 | Nakatsuka | B60W 50/12 |
| 2018/0370512 | A1 | 12/2018 | Witte et al. | |
| 2020/0255026 | A1* | 8/2020 | Katardjiev | B60W 10/20 |

FOREIGN PATENT DOCUMENTS

| | | | | |
|---|---|---|---|---|
| JP | 2007216790 A | | 8/2007 | |
| JP | 2007237838 A | | 9/2007 | |
| WO | WO-2009015942 A1 | * | 2/2009 | ........... B62D 15/027 |

OTHER PUBLICATIONS

Written Opinion for PCT/FR2018/052770 dated Aug. 1, 2019.
Search Report for FR application No. 1760529 dated Jun. 27, 2018.
Office action issued for Japanese application No. 2020-525848 dated Nov. 18, 2022.

* cited by examiner

SYSTEM FOR SECURING THE PARKING OF A MOTOR VEHICLE

CROSS-REFERENCE TO RELATED APPLICATIONS

This is a National Stage application of PCT international application PCT/FR2018/052770, filed on Nov. 8, 2018, which claims the priority of French Patent Application No. 1760529, filed Nov. 9, 2017, both of which are incorporated herein by reference in their entirety.

TECHNICAL FIELD AND STATE OF PRIOR ART

The present invention relates to a system for securing the parking of a vehicle, to a vehicle including such a securing system and to a method for securing the parking of a vehicle.

In most current automobile vehicles, the parking brake function aiming at halting a stationary vehicle is ensured by disc brakes or drum brakes located at the rear wheels.

It is common to equip the front end with disc brakes and the rear end with drum brakes. In this configuration, the parking brake function is performed by drum brakes.

Applying the parking brake is in most cases achieved by pulling a lever disposed in the passenger compartment which is connected to a mechanism located in the drum brake through a brake cable. The mechanism tends to pull the brake shoes away from the drum brakes to apply them against the drums or to apply linings to the disc.

The application of the parking braking can also be automatically performed by implementing an electric actuator at each brake of the rear wheels. For example, by depressing a button located on the dashboard, the actuator causes the shoes to be applied to the drum in the case of drum brakes or the linings of the shoes in the case of disc brakes.

These systems are satisfactory. However, it is attempted to improve the security both of the driver and passengers and also of people who can be around the vehicle. It could result from an insufficient braking application or a technical failure that the parking brake function is not properly ensured. An insufficient braking application could result from the application of an insufficient force to the lever to properly apply the parking brake. In the case of disc brakes, when the brakes have become overheated, upon cooling down, the application force of the linings to the disc decreases.

This can raise a problem when the vehicle is parked on a sloping roadway. In case of an insufficient application of the brakes or in case of brake release, the vehicle would no longer be halted and would move along the slope, with a risk of hitting people and/or vehicles. Further, if the driver and/or the passengers have remained in the vehicle, they could also be injured. It is not obvious that the driver would be capable of stopping the vehicle, in particular due to the element of surprise and/or panic felt.

DISCLOSURE OF THE INVENTION

Consequently, a purpose of the present invention is to offer a system for securing the parking of a vehicle and a method for securing the parking of a vehicle, offering a very high security level in a very large number of situations.

The purpose of the present invention is achieved by a system for securing the parking of a vehicle including means for assessing the external environment and means for orienting the wheels of the vehicle depending on the external environment, so as for example to reduce the required braking level, or guide the vehicle to a lower danger direction, in anticipation of an unintentional movement of the vehicle, for example due to an insufficient application of the parking brake.

In one example, the wheels are oriented outwardly of the roadway or towards an element bordering the parking area and capable of forming an obstacle to stop the vehicle.

In another example, the wheels are oriented so as to reduce the braking force required to ensure halting of the vehicle. For example, by orienting the wheels along a direction having a maximum angle with respect to the slope of the roadway. Thus, a braking level higher than that required can also be more readily applied, reducing brake release risks. It can be contemplated, according to one alternative, to adapt the application level of the brakes, enabling the lifetime of the brakes to be increased, or the brake size to be reduced.

In other words, the environment surrounding the vehicle is determined and the vehicle is placed in a configuration offering an increased security.

Thereby, one subject-matter of the present invention is a system for securing the parking of an automobile vehicle parked on a parking area, said vehicle extending along an axis, the vehicle including at least one axle ensuring the steering of the automobile vehicle, the wheels equipping said axle being designated as "steering wheels", and means for modifying the orientation of the steering wheels without the action of the driver, the system including
  a control unit,
  means for detecting a parked state of the automobile vehicle,
  means for detecting the slope of the parking area,
  means for determining the orientation of the steering wheels with respect to the axis of the vehicle,
  means for determining the configuration of elements constituting the parking area, sorting means for excluding elements not capable of forming a safe obstacle for the vehicle and means for selecting from said remaining elements, at least one element capable of forming a safe obstacle for the vehicle,
  the control unit including means for determining an orientation of the steering wheels to reduce the required braking level and/or placing the vehicle in a decreased danger configuration in case of an unwanted movement of the vehicle, and to send an instruction to the means for modifying the orientation of the steering wheels without the action of the driver, to orient the steering wheels according to the orientation determined by the control unit,
  wherein the control unit is configured to orient the steering wheels, such that the trajectory of the vehicle downstream of the same intersects said element selected as a safe obstacle.

For example, the means for determining the configuration of the elements constituting the parking area include at least one object detecting sensor and/or cameras. The object detecting sensor(s) include(s) for example a radar and/or a sonar.

The control unit can include a calculator applying a pattern recognition software to the images provided by the camera(s).

The means for detecting a parked state of the automobile vehicle can include means for detecting the activation of a parking brake. The unwanted movement of the vehicle can correspond to an insufficient braking level.

Another subject-matter of the present invention is an automobile vehicle including at least one axle ensuring the orientation of the vehicle, means for modifying the orientation of the steering wheels without the action of the driver and a securing system according to one of the preceding claims.

Another object of the present invention is a method for securing a vehicle parked in a parking area, said vehicle including at least one axle ensuring the orientation of the vehicle, means for modifying the orientation of the steering wheels without the action of the driver, the method including the steps of:

a) detecting the parked state of the vehicle,
b) detecting the slope of the parking area,
c) determining the configuration of elements constituting the parking area,
d) sorting the elements constituting the parking area to exclude elements not capable of forming a safe obstacle for the vehicle,
e) selecting from said remaining elements, at least one element capable of forming an obstacle for the vehicle,
f) determining the orientation of the steering wheels ensuring the decrease of the required braking level and/or ensuring that the trajectory of the vehicle downstream of the same intersects said element selected as an obstacle,
g) generating an instruction to the means for modifying the orientation of the steering wheels without the action of the driver, to orient the steering wheels according to the orientation determined in step f).

Step f) can compare the angle formed between the slope and the orientation of the steering wheels and determine the movement angle required to reach a maximum angle between the slope and the orientation of the steering wheels.

In the case where the parking area is bordered on one side by a traffic lane and on another side by a traffic-free area, if during step e) no element is selected, during step f) an instruction can be generated to the means for modifying the orientation of the steering wheels without the action of the driver, to orient the steering wheels such that the trajectory of the vehicle downstream of the same is oriented to the traffic-free lane.

The securing method can also include determining the orientation of said vehicle with respect to the slope and, during step c) of determining the elements of the parking area only downstream of the vehicle.

Advantageously, during step a), the activation of the parking brake is detected.

BRIEF DESCRIPTION OF THE DRAWINGS

The present invention will be better understood based on the following description and the appended drawings in which.

DETAILED DISCLOSURE OF PARTICULAR EMBODIMENTS

Figure 1:
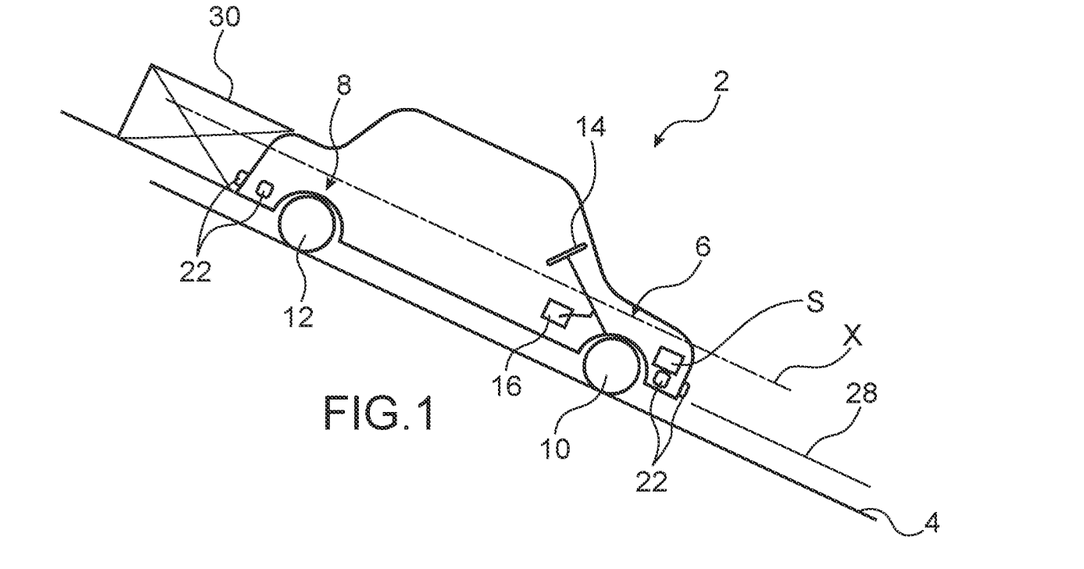
FIG. 1 is a schematic representation of a side view of an automobile vehicle parked on a parking area.
Figure 2A:
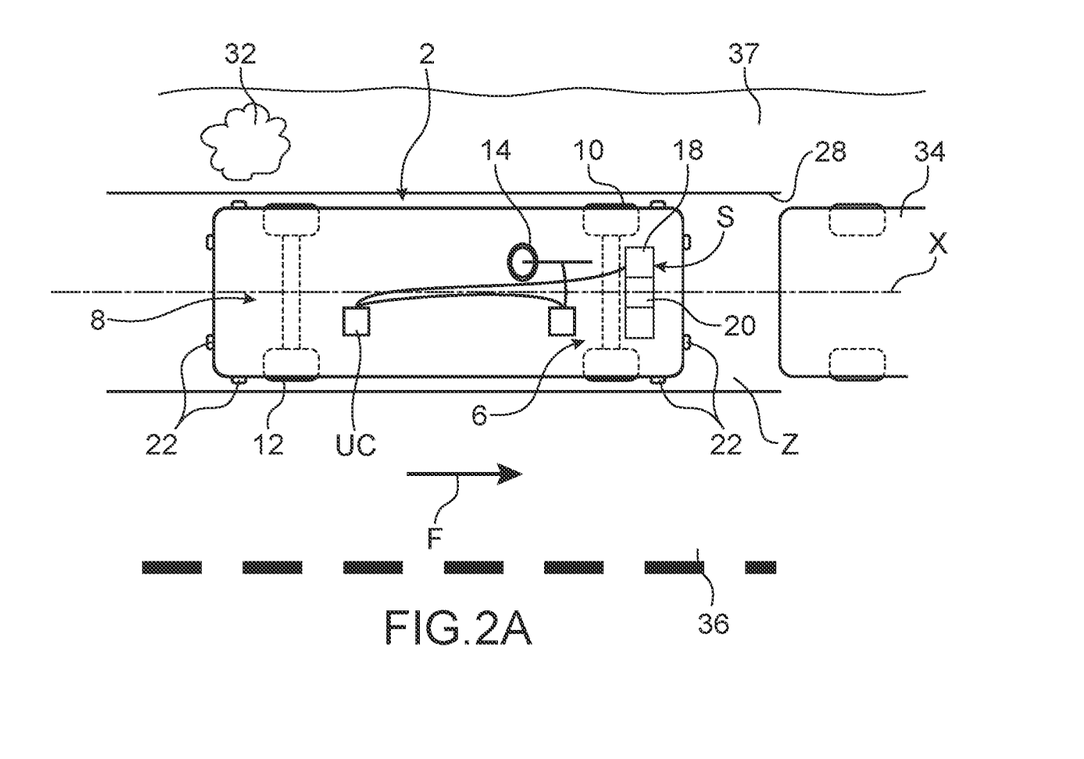
FIG. 2A is a schematic representation of a top view, of the vehicle of FIG. 1 in a non-secured configuration.
Figure 2B:
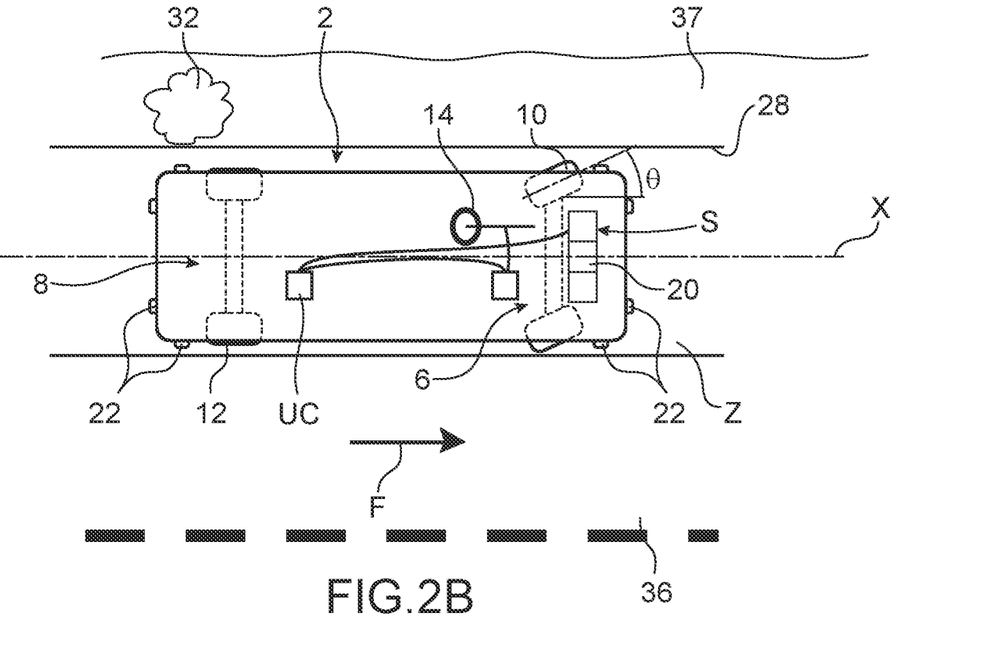
FIG. 2B is a schematic representation of a top view, of the vehicle of FIG. 1 in a secured configuration by means of the invention.

In FIGS. 1 and 2A, 2B, schematic representations of a side view and top views respectively, of an automobile vehicle 2 parked on a sloping roadway 4 can be seen.

In this example, the vehicle 2 includes a front axle 6 and a rear axle 8. Each front and rear axle includes two wheels 10, 12 respectively. The vehicle extends along an axis X.

In this example, it is considered that the front axle 6 ensures the steering the vehicle, i.e. at least the orientation of the front axle wheels is used to control the vehicle steering. The wheels of the axle 6 are designated as "steering wheels".

The wheels of the front axle 6 can be oriented by an action of the driver on a handwheel 14, or by an actuator such as an electric motor 16.

The vehicle includes brakes at each wheel. For example, on the wheels of the front axle, these are disc brakes, and on the wheels of the rear axle, these are drum brakes. The brakes can be activated by the driver's action on a brake pedal.

The vehicle includes a parking brake system. The parking brake system includes means for ensuring holding brake application, at least the brakes of the rear axle 8, temporarily without an action on the brake pedal. The parking brake function can be activated by pulling a brake lever located in the passenger compartment, which exerts a pull onto a cable connected to the brakes equipping the rear wheels, either by depressing a button also located in the passenger compartment which causes the rear brake to be applied, or by means of motors located on the brakes, or a motor which exerts a pull force onto a cable.

The vehicle also includes a system for securing S the vehicle in the parked state. The securing system includes means for determining a configuration of the environment of a parking area Z on which the vehicle is parked.

The purpose of the securing system is to maximise the parking security of the automobile vehicle.

According to a first embodiment, the securing system S includes a control unit UC and means 18 for enabling the slope of the area Z and possibly the value of this slope to be determined, for example by a slope or tilt sensor. Advantageously, the means 18 implement sensors and/or a device used by other systems commonly equipping the automobile vehicles, typically a slope sensor of a trajectory control system, for example ESP® (Electronic Stability Control) and/or a camera of the adaptive cruise control.

The securing system also includes means for determining the orientation of the steering wheels with respect to the axis of the vehicle, means 20 for mapping the area Z. The securing system S also advantageously includes means for determining the orientation of the vehicle with respect to this slope, i.e. whether the front of the vehicle is downstream or upstream of the slope.

With the means 20, it is attempted to detect the element(s) forming the environment of the vehicle.

Some of these elements are likely to form an obstacle for the vehicle and against which it is likely to come in contact to be halted, in the case where the parking brake function ensured by the brake action would be insufficient.

For example, the means 20 include sensors 22 able to detect and/or view the elements constituting the area Z and which surround the vehicle. For example, the sensors include one or more electromagnetic wave radars, one or more sonars implementing ultrasounds, one or more cameras.

These sensors 22 can already equip the vehicle, for example to perform rear view radar or rear view camera functions and used, for example for parking assistance, speed control or the like.

The parking securing system uses all or part of existing sensors. Alternatively, it includes some dedicated sensors and uses sensors implemented for other functions.

This sensor sharing is applicable because the parking assistance is generally used prior to using the securing system.

The mapped elements of the environment can be, in a non-exhausting way, one or more road kerbs 28, one or more barriers 30, one or more trees 32, one or more street lamps, one or more traffic signs, one or more vehicles 34 parked in the surroundings, the traffic lane 36, a traffic-free lane 37 . . . .

The signals measured by the different sensors are transmitted to the control unit which includes a calculator able to process these signals and establish an "image" of the area.

For example, the radars or sonars detect the presence of an obstacle and their distance from the vehicle. The camera(s) acquire(s) images of these obstacles. A pattern recognition software is advantageously implemented to determine which object it is. For example, the control unit includes a database of patterns of objects most likely to be located in or around a roadway. Advantageously, the pattern recognition uses a fuzzy logic.

The control unit advantageously includes several databases, each associated with an environment type. For example, from data on the vehicle position determined by means of the coordinates of the Global Positioning System (GPS) (or GPS coordinates) of the navigation system equipping the vehicle, the control unit can determine whether the vehicle is parked in an urban or rural area, and for example in the case of a rural area, whether it is a low relief area or a mountain area. Very advantageously, the control unit could also have access to databases accessible on the Internet, such as "Google Maps®" or others, to correlate its own conclusions to photographs of the area otherwise taken.

The control unit advantageously includes a database listing local laws applied to parking, which dictate a wheel orientation when a vehicle is parked, this is for example the case in Canada and in some States of the United States of America.

In addition, the control unit is capable of determining which elements forming the environment are likely to form a fulcrum or obstacle capable of stopping the vehicle. For example, several conditions can be entered in the calculator to sort the elements.

By way of non-limiting and non-exhaustive example, the conditions can be:
  the element size, for example a stunted tree or a waste container which is not fastened to the ground, would be excluded from potential obstacles.
  The distance of the element from the vehicle.
  The durability of the element: for example, if it is a parked vehicle, the calculator can exclude this element as a potential obstacle because the vehicle is strongly likely to be moved, and thus not to form a durable obstacle.

Further, after one or more potential obstacles have been identified, the calculator can make one or more sorting operations to discriminate the obstacles. For example, it can choose the one or those which offer most security to stop the vehicle, for example a road kerb could be preferred to a safety barrier.

The calculator can also apply filters to obstacles offering an equivalent security level, taken risks of damage to the vehicle into account, for example taking the part(s) of the vehicle likely to come in contact with the obstacle-forming element into account. For example, the calculator may prefer a road kerb forming an abutment for tires to one or more studs forming an abutment for the bumper and likely to crash into it.

Figure 3:
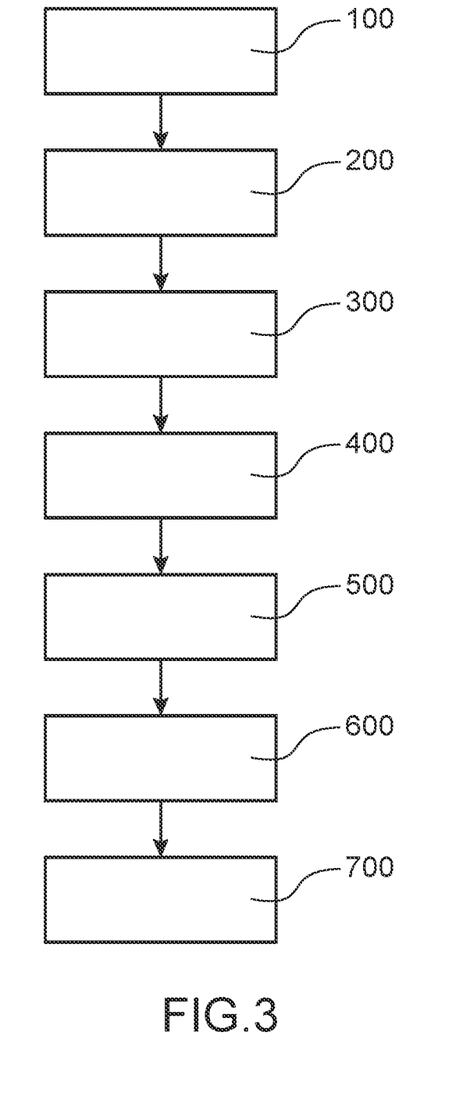
FIG. 3 is a flowchart of an exemplary implementation of the securing system according to the invention.

An exemplary implementation of the securing system according to the invention will now be explained using the flowchart of FIG. 3.

The driver has parked his/her vehicle on the area Z, for example using parking assistance. For example, the area Z is sloping.

During a first step 100, the driver or vehicle activates the parking brake function, by pulling the brake lever or depressing a button or actuating any other means. At least the brakes of the wheels of the rear axle are applied ensuring halting of the vehicle. The steering wheels are typically parallel to the axis X (FIG. 2A).

In step 200, the control unit UC detects the activation of the parking brake function, for example by means of a sensor on the brake lever and then triggers the environment determination process. The control unit "knows" that the vehicle is parked for an extended period of time. The control unit UC can also or alternatively detect whether the ignition has been switched off and/or the doors have been locked and/or if whether the driver is no longer in his/her seat by means of presence sensors generally equipping at least the driver's seat.

During a step 300, preferably it determines whether the area Z is sloping and possibly the value of the slope of the area Z by means of a slope sensor or inclinometer and advantageously the orientation of the vehicle with respect to the slope. For example, if the axis of the vehicle is aligned with the slope, it determines whether, in case of brake release, the vehicle will move backwards or forwards. The control unit has thus advantageously determined on which side of the vehicle elements likely to form an obstacle to the vehicle are to be detected. The determination of the slope occurs when the vehicle is stopped or before it stops.

During a step 400, the control unit activates the different means set forth above, such as the radar(s), the sonar(s), the rear view camera(s) in order to collect information about the elements constituting the area. Preferably, these are only the means located on the vehicle on the side where an obstacle is searched for, i.e. on the downstream side of the vehicle. By thus selecting the sensors, the power consumption for this step is reduced. Alternatively, the acquisition is performed when the vehicle is parked.

During a step 500, data acquired by the different acquisition means are transmitted to the calculator which processes data and put them together to determine the nature of the elements and their location with respect to the vehicle and thus obtain a knowledge of the vehicle environment.

During a step 600, the calculator selects the possible element(s) capable of forming an obstacle for the vehicle. For this, it can apply one or more filter(s) Fi, as described above, for example by applying proximity, robustness, dangerousness conditions . . . . At the end of this step, an element is identified as capable of forming a safe obstacle for the vehicle if the brakes came to be released or if the braking force was insufficient. The slope value and the vehicle type, for example the mass thereof, can be taken into account for selecting the element.

For example, a pole, a sufficiently high pavement can be considered as safe obstacles. Marking on the ground, a shadow, a bush, a person located around the parking area, a moving obstacle such as a moving barrier or a car, for example cannot be considered as forming safe obstacles. However, it will be explained for example that a vehicle can be considered as an acceptable obstacle provided that its presence is subsequently checked.

During a step 700, the control unit sends an instruction to an electric actuator to orient the steering wheels, for example by rotating the handwheel, such that, if the brakes are released, the vehicle travel is such that the vehicle is directed to the element designated as an obstacle. Thus, in case of an insufficient action of the brakes, the vehicle is quickly stopped and the security of its possible occupants and/or any person around the vehicle, for example pedestrians and motorists is ensured.

For example, if the element chosen as an obstacle is a road kerb running along the left side of the vehicle looking forward of the vehicle, the steering wheels are rotated by a certain angle θ in the counterclockwise direction (FIG. 2B).

If the element chosen as an obstacle is a wall located downstream of the vehicle, the steering wheels are not rotated.

Steps 300 and 400 can be inverted. By carrying out step 300 before step 400, the control unit can decide not to perform the other steps if the vehicle is on a flat surface or on a very low slope area. Further, by determining the orientation of the vehicle with respect to the slope, the amount of data to be acquired and processed can be reduced.

Steps 500 and 600 can be made simultaneously or successively. For example, at each identification of an element, the calculator classifies it as a potential obstacle, or as an element not capable of forming an obstacle. According to another example, the calculator identifies all the elements: road kerb, trees, studs . . . and then sorts the elements depending on whether they are capable of forming an obstacle or not.

In the example described above, the steering wheels of the vehicle are oriented such that the vehicle leans on an obstacle and is stopped.

In another example, for example if no element capable of forming a safe obstacle is detected, the control unit sends an instruction to orient the steering wheels outwardly of the traffic area, thus if the braking application level is insufficient, the vehicle will not go into the traffic lane. In another example, even if an element capable of forming a safe obstacle is detected, the control unit can decide to send an instruction to orient the steering wheels outwardly of the traffic area, because it considers that this configuration is the safest.

In another example, if no element capable of forming a safe obstacle is detected, it can be decided that a parked vehicle will form the possible obstacle. In this case, it can be contemplated to periodically check the presence of the vehicle. If it is no longer parked or if the vehicle replacing it is too small, the control unit can decide to choose another potential obstacle.

Figure 4:
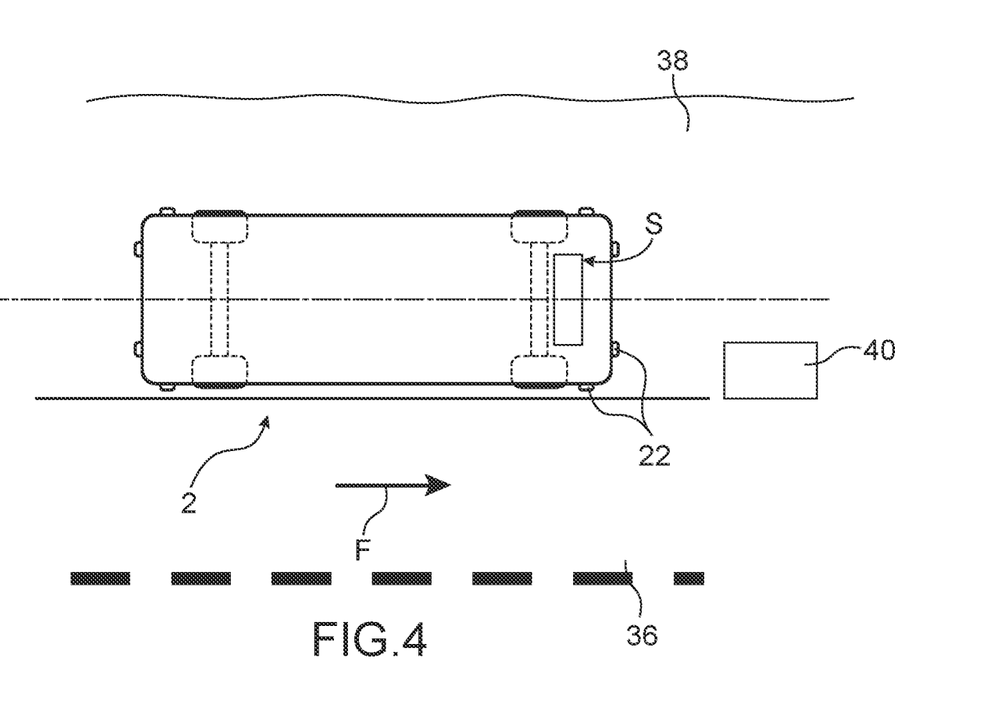
FIG. 4 is a schematic representation of a top view of an automobile vehicle parked in a parking area according to another example.

In FIG. 4, another configuration of the area Z where the vehicle is parked can be seen. The arrow F indicates the slope direction.

The traffic lane 36 is located on the right of the vehicle in the slope direction, the part 38 on the left of the vehicle is a pavement-free pedestrian lane and in the same plane as the traffic lane. On the left front side of the vehicle in the slope direction, there is a central kerb 40. In this configuration, the control unit can decide to orient the steering wheels towards the central kerb 40 to form a possible obstacle for the vehicle, and not towards the pedestrian lane 38 reducing the risk of injuring pedestrians moving on this lane.

In a second embodiment, the securing system includes a control unit UC and means 22 for determining whether the area Z is sloping and possibly the slope value, means for determining the orientation of the vehicle with respect to this slope and means for determining the orientation of the steering wheels with respect to the vehicle axis, and means for modifying the orientation of the steering wheels without an action of the driver.

The detection means implemented in the first embodiment are applicable for the second embodiment and will not be repeated.

Steps 100, 200 and 300 of the first embodiment are also applicable to the second embodiment.

After step 300, the control unit determines the orientation of the steering wheels reducing the braking force to be applied to the brakes to provide the parking brake function, advantageously reducing as much as possible the braking force to be applied to provide the parking brake function. For this, from the knowledge of the slope and orientation of the vehicle, it can determine the steering angle to be applied to the steering wheels.

Preferably, during a step following step 300, the control unit sends an instruction to the actuator to orient the steering wheels such that the steering wheels form a maximum angle with respect to the slope. By "maximum angle", it is meant the maximum attainable angle according to the possible steering angle of the steering wheels.

By means of the invention, it can be contemplated for example to reduce the brake size because of the reduction in the braking application level required in a parking situation.

Advantageously, the control unit is that of a braking system which manages trajectory control functions, for example the anti-lock braking system (ABS), ESP system, anti-slip regulation (ASR).

The first and second embodiments can be combined to each other. Indeed, for example if both elements capable of forming an obstacle offering the same security level are detected, the control unit can choose one of the elements as a function of the orientation of the steering wheels with respect to the slope which reduces the braking level required.

For example, if the control unit has detected a downstream wall in front of the vehicle and a road kerb on the left of the vehicle in the slope direction, the control unit will favour the road kerb because the orientation of the steering wheels forms an angle with respect to the slope, partly reducing the braking force required with respect to a configuration in which the steering wheels are aligned with the slope.

Figure 5:
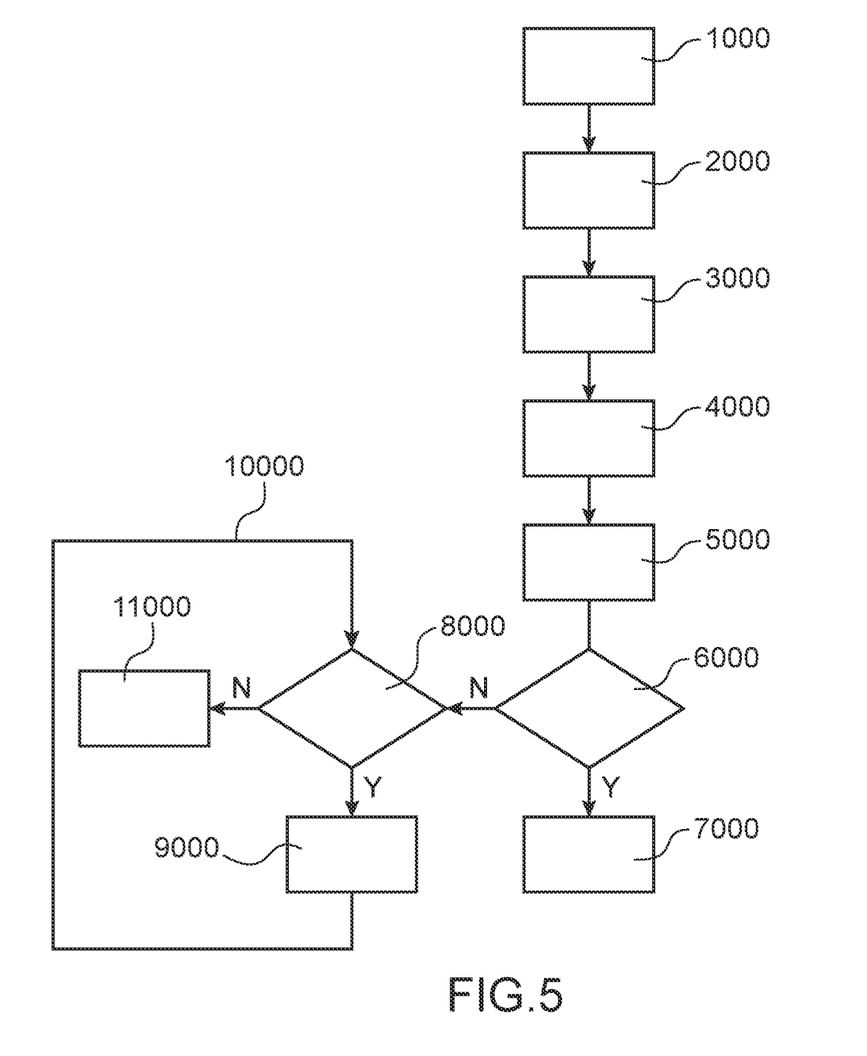
FIG. 5 is a flowchart of another exemplary implementation of the securing system according to the invention.

Another exemplary implementation of the securing system according to the invention will now be explained using the flowchart of FIG. 5.

The driver has parked his/her vehicle in the area Z, for example using parking assistance. For example, the area Z is sloping.

During a first step 1000, the driver or vehicle activates the parking brake function, by pulling the brake lever or depressing a button or actuating any other means. By this means, the brakes of the wheels of the rear axle are applied ensuring halting of the vehicle. The steering wheels are typically parallel to the axis X (FIG. 2A).

In step 2000, the control unit UC detects the activation of the parking brake function, for example by means of a sensor on the brake lever and thereby triggers the environment determination process. The control unit "knows" that the vehicle is parked for an extended period of time. The control unit UC can also or alternatively detect whether the ignition has been switched off and/or the doors have been locked and/or if the driver is no longer in the driver's seat by means of presence sensors generally equipping at least the driver's seat.

During a step 3000, preferably it determines whether the area Z is sloping and possibly the slope value of the area Z by means of a slope sensor or inclinometer and advantageously the orientation of the vehicle with respect to the slope. For example, if the axis of the vehicle is aligned with the slope it determines whether, in case of brake release, the vehicle will move backward or forward. The control unit has thus advantageously determined on which side of the vehicle elements likely to form an obstacle to the vehicle are to be detected. The determination of the slope occurs when the vehicle is stopped or before it stops.

During a step 4000, the control unit activates the different means set forth above, such as the radar(s), sonar(s), rear view camera(s) in order to collect information about the elements constituting the area. Preferably, these are only the means located on the vehicle on the side where an obstacle is searched for, i.e. on the downstream side of the vehicle. By thus selecting the sensors, the power consumption for this step is reduced. Alternatively, the acquisition is performed upon parking the vehicle.

During a step 5000, data acquired by the different acquisition means are transmitted to the calculator which processes data and put them together for, on the one hand, determining the nature of the elements and their location with respect to the vehicle and thus obtaining a knowledge of the vehicle environment.

During a step 6000, the calculator selects from the different element(s) of the environment, the possible fixed element(s) capable of forming a safe obstacle for the vehicle. For this, it can apply one or more filter(s) Fi, such as described above, for example by applying proximity, robustness, dangerousness conditions . . . . If at the end of this step, a fixed element is identified as capable of forming an obstacle for the vehicle if the brakes came to be released. The slope value and vehicle type, for example the mass thereof, can be taken into account for selecting the element.

For example, a pole, a sufficiently high pavement can for example be considered as safe fixed obstacles. Marking on the ground, a shadow, a bush, a person located around the parking area, a moving obstacle such as a moving barrier or a car are for example not considered as capable of forming safe fixed obstacles.

If a fixed obstacle has been identified in step 6000, during a step 7000, the control unit sends an instruction to an electric actuator to orient the steering wheels, for example by rotating the handwheel, such that, if the brakes are released, the vehicle travel is such that the vehicle is directed to the element determined as a safe obstacle. Thus, in case of an insufficient action of the brakes, the vehicle is quickly stopped and the security of its possible occupants and any person around the vehicle, for example pedestrians and motorists is ensured.

For example, if the element chosen as a safe obstacle is a road kerb running along the left side of the vehicle looking forward of the vehicle, the steering wheels are rotated by a certain angle θ in the counterclockwise direction (FIG. 2B).

If the element chosen as a safe obstacle is a wall located downstream of the vehicle, the steering wheels are not rotated.

If no safe fixed obstacle has been identified, in step 8000, the control unit analyses safe obstacles which are likely to be moved, for example a stationary vehicle. If such a safe obstacle is identified, the wheels are oriented such that in case of release of the brakes, the vehicle is directed to this obstacle (step 9000). Very advantageously, monitoring 10000 the persistence of this obstacle is made, for example by periodically reactivating the different systems to analyse the situation and modify if necessary the wheels orientation, for example if the vehicle which was considered as a safe obstacle has left.

If no safe obstacle has been identified or if the safe obstacle is no longer present, then the control unit sends an instruction to orient the wheels so as to reduce the braking level required (step 11000), for example by turning the wheels to the maximum.

Very advantageously, the instructions given by the control unit take the regulation of the parking place into account, for example obligation to steer the wheels outwardly of the roadway in some countries or States. Preferably, the control unit favours at least the orientation of the wheels which is in accordance with the legislation.

The legislative database is advantageously coupled with the GPS to detect the place (country or State) where the vehicle is located in order to determine the applicable legislation.

Steps 3000 and 4000 can be inverted. By making step 3000 before step 4000, the control unit can decide not to perform the other steps if the vehicle is on a flat surface or on a very low slope area, or then to directly apply step 11000. Further, by determining the orientation of the vehicle with respect to the slope, the amount of data to be acquired and processed can be reduced.

Steps 5000 and 6000 can be made simultaneously or successively. For example, at each identification of an element, the calculator classifies the same either as a potential obstacle, or as an element not capable of forming an obstacle. According to another example, the calculator identifies all the elements: road kerb, trees, studs . . . and then sorts the elements depending on whether they are capable of forming an obstacle or not.

In the case where it is step 11000 (orientation of the wheels to reduce the braking level required) which is applied, it is contemplatable to perform monitoring of the environment to detect whether a safe obstacle is put in place, for example a vehicle coming to park downstream of the vehicle in the slope direction. In the case where such a safe obstacle appears, the orientation of the wheels can be modified. It will be understood that the invention is also applicable to vehicles including two axles capable of steering the vehicle and/or more than two axles, the orientation modifications being applicable to one or more axles.

In the examples above, the activation of the parking brake has been described before securing the vehicle. According to another example, this activation may not occur for example because the vehicle is on a horizontal parking area and the driver has not deemed it necessary to activate it. The securing system can however be activated as a precautionary measure. For example, before securing the vehicle, the system can compare several pieces of information to decide whether or not the vehicle is parked. For example, if the system detects that the ignition has been switched off and/or the doors have been locked and/or the driver is no longer on his/her seat, but nevertheless that the parking brake has not been activated, it can decide that the vehicle is in a parked state and initiate the securing procedure.

The securing system can be deactivated by the driver, for him/her to be able to orient the vehicle wheels in the direction he/she considers the most secure, and which could be different from that which would have been determined by the securing system.

2—automobile vehicle
4—slopping roadway
6—front axle
8—rear axle
10—front wheels
12—rear wheels
14—handwheel
16—electric motor
18—means for determining the direction and sense of the slope
20—means for determining the configuration of the parking area
22—detecting and/or viewing sensors
28—road kerb
30—barrier
32—tree
34—vehicle
36—traffic lane
37—non-traffic lane
38—pedestrian lane
40—central kerb
F—slope direction
S—securing system
X—axis of the automobile vehicle
Z—parking area
UC—control unit

What is claimed is:

1. A securing system for securing parking of an automobile vehicle parked on a parking area, said automobile vehicle extending along an axis, the automobile vehicle including at least one axle ensuring steering of the automobile vehicle, wheels of the automobile vehicle equipping said axle being designated as "steering wheels", and at least one actuator configured to modify an orientation of the axle and of the steering wheels without action of the driver, the securing system including:
  a control unit including a processor,
  at least one sensor for detecting a parked state of the automobile vehicle,
  at least one sensor for detecting a slope of the parking area,
  at least one sensor for determining the orientation of the steering wheels with respect to the axis of the automobile vehicle,
  at least one sensor for determining a configuration of elements constituting the parking area,
  at least one sorting device for excluding elements not capable of forming a safe obstacle for the automobile vehicle and at least one selecting device for selecting from remaining elements not excluded by the sorting device, wherein the at least one sorting device is configured to exclude elements not capable of forming the safe obstacle for the automobile vehicle by filtering out elements based on element size, a distance of the element from the automobile vehicle, and a durability of the element, and
  at least one element capable of forming the safe obstacle for the automobile vehicle, wherein the safe obstacle is configured to stop the automobile vehicle in case of an unwanted movement of the automobile vehicle,
  the control unit including at least one sensor for determining an orientation of the steering wheels to reduce a required braking level and/or placing the automobile vehicle in a decreased danger configuration in case of an unwanted movement of the automobile vehicle, and to sending an instruction to the actuator for modifying the orientation of the steering wheels without the action of the driver, to orient the steering wheels according to the orientation determined by the control unit, wherein the control unit is configured to orient the steering wheels, such that a trajectory of the automobile vehicle downstream of the automobile vehicle intersects said element selected as the safe obstacle.

2. The securing system according to claim 1, wherein the at least one sensor for determining the configuration of the elements constituting the parking area include at least one object detecting sensor and/or cameras.

3. The securing system according to claim 2, wherein the object detecting sensor(s) include(s) a radar and/or a sonar.

4. The securing system according to claim 2, wherein the processor of the control unit applies a pattern recognition software to images provided by the camera(s).

5. The securing system according to claim 1, wherein the at least one sensor for detecting a parked state of the automobile vehicle include at least one sensor for detecting activation of a parking brake and wherein the unwanted movement of the automobile vehicle corresponds to an insufficient braking level.

6. An automobile vehicle including at least one axle ensuring the orientation of the automobile vehicle, the least one actuator for modifying the orientation of the steering wheels without the action of the driver and a securing system according to claim 1.

7. The securing system according to claim 1, wherein the at least one sorting device is configured to exclude elements not capable of forming a fixed safe obstacle for the automobile vehicle, and the at least one selecting device is configured to select from remaining elements not excluded by the at least one sorting device at least one element capable of forming a fixed safe obstacle for the automobile vehicle.

8. The securing system according to claim 7, wherein in case no fixed safe obstacle is selected by the at least one selecting device, the at least one sorting device is configured to exclude elements not capable of forming a non-fixed safe obstacle for the automobile vehicle, and the at least one selecting device is configured to select from remaining elements not excluded by the at least one sorting device at least one element capable of forming a non-fixed safe obstacle for the automobile vehicle, wherein the non-fixed safe obstacle is able to move relative to the parked vehicle.

9. The securing system according to claim 8, wherein the at least one sensor for determining a configuration of elements constituting the parking area is configured to monitor the persistence of the non-fixed safe obstacle.

10. A securing method for securing a vehicle parked in a parking area, said vehicle including at least one axle ensuring an orientation of the vehicle, at least one actuator for modifying the orientation of the axle and of the of steering wheels of the vehicle without action of the driver, the method including the steps of:
  a) detecting a parked state of the vehicle,
  b) detecting a slope of the parking area,
  c) determining a configuration of elements constituting the parking area,
  d) sorting from the elements constituting the parking area to exclude elements not capable of forming a safe obstacle for the vehicle, wherein the safe obstacle is configured to stop the automobile vehicle in case of an unwanted movement of the automobile vehicle, and the sorting comprises excluding elements not capable of forming the safe obstacle for the automobile vehicle by filtering out elements based on element size, a distance of the element from the automobile vehicle, and a durability of the element, e) selecting from remaining elements not excluded in step d), at least one element capable of forming an obstacle for the vehicle, f) determining the orientation of the steering wheels ensuring a decrease of a required braking level and/or ensuring that a trajectory of the vehicle downstream of the vehicle intersects said element selected as an obstacle, g) generating an instruction to the actuator for modifying the orientation of the steering wheels without the action of the driver, to orient the steering wheels according to the orientation determined in step f), and h) controlling, by a processor, the vehicle to orient the steering wheels according to the determined orientation determined.

11. The securing method according to claim 10, wherein step f) compares an angle formed between the slope and the orientation of the steering wheels and determines a movement angle required to reach a maximum angle between the slope and the orientation of the steering wheels.

12. The securing method according to claim 10, wherein, the parking area being bordered on one side by a traffic lane and on another side by a traffic-free area, if during step e) no element is selected, during step f) an instruction is generated to the at least one actuator for modifying the orientation of the steering wheels without the action of the driver, to orient the steering wheels such that the trajectory of the vehicle downstream of the same is oriented to the traffic-free lane.

13. The securing method according to claim 10, including determining the orientation of said vehicle with respect to the slope and, during step c) of determining the elements of the parking area only downstream of the vehicle.

14. The securing method according to one claim 10, wherein during step a), activation of the parking brake is detected.

15. The securing system according to claim 4, wherein the pattern recognition software of the control unit uses a fuzzy logic for determining a configuration of elements constituting the parking area.

* * * * *